July 22, 1969   M. B. GENTRY, JR., ET AL   3,457,489
CHARGING CIRCUITS
Filed Sept. 26, 1966                    2 Sheets-Sheet 1
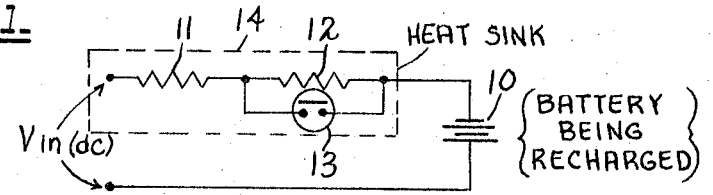
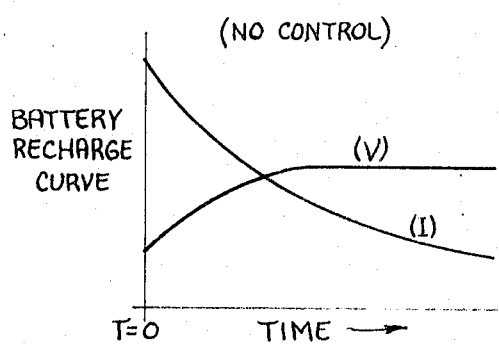
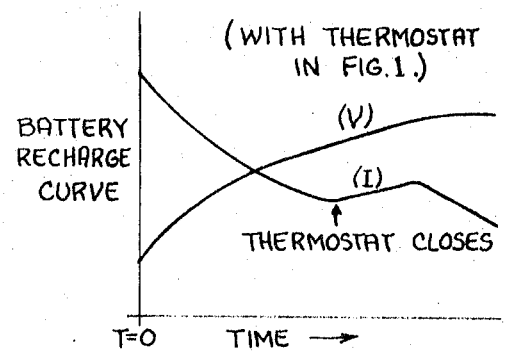
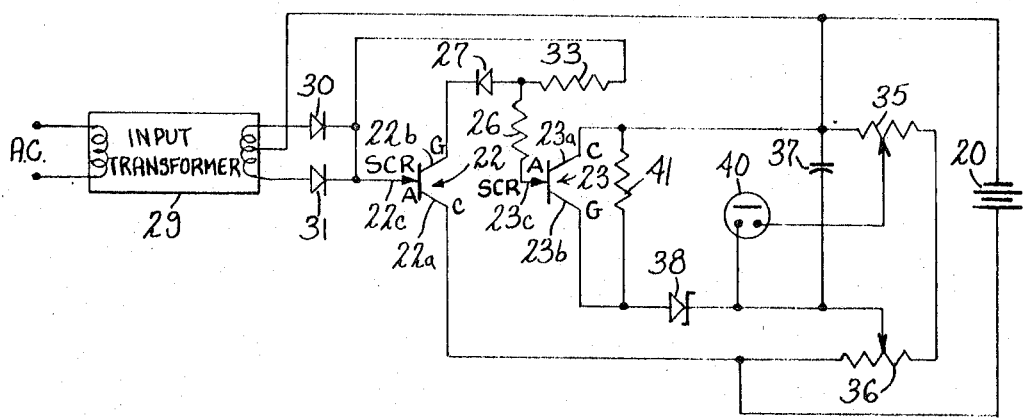
INVENTORS
Martin B. Gentry, Jr.
Thomas G. Collings
BY  Dedio and Montgomery
ATTORNEYS United States Patent Office 3,457,489
Patented July 22, 1969

3,457,489
CHARGING CIRCUITS
Martin Butler Gentry, Jr., and Thomas Guy Collings, Hamden, Conn., assignors to Teal Industries, Inc., North Haven, Conn.
Filed Sept. 26, 1966, Ser. No. 581,876
Int. Cl. H02j 7/10
U.S. Cl. 320—22                                    13 Claims

ABSTRACT OF THE DISCLOSURE

This invention relates to battery charging circuits and more particularly to a battery charging circuit which provides a surcharge to bring the battery up to rated electrical capacity. This is accomplished by the use of a temperature sensitive means which recognizes a drop in current in the recharging circuit and thereafter causes a surcharge of current to be provided to the battery being recharged to bring it to its full rated electrical capacity. Timing means are also provided in some of the embodiments to assure that the surcharge is provided for a predetermined period of time.

---

This invention relates to apparatus adaptable for charging a battery or the like and is more particularly directed to charging circuits which are especially suitable for providing current surcharge to batteries such as nickel alkaline batteries. This invention is further directed to means for insuring that the current surcharge is provided for a predetermined time interval.

It has been the common experience in the battery charging art that nickel alkaline batteries will not recharge up to their rated electrical capacity if coupled directly to a recharging circuit. The experience to date has been that the battery in such circumstances will charge up to approximately 80% of its rated electrical capacity but will charge no higher. This has resulted in such batteries, used with emergency lighting systems or the like, not having available the current necessary to to keep the emergency systems operable for prolonged periods of time.

Applicants have found that in order to charge a nickel alkaline battery to its rated electrical capacity, a surcharge must be provided, that is, sufficient current must be forced into the battery to raise it to substantially 100% of its original rated capacity.

In accordance with this invention, applicants have provided new and improved means for providing a current surcharge to a battery. In the preferred embodiment of this invention applicants have provided means for reestablishing the charging cycle for a predetermined period of time. This has been accomplished as the result of a recognition of a decrease in current through the charging circuit as the battery is recharged. More particularly, the decrease in recharging current to the battery is detected by the use of temperature sensing means, such as a thermostat, which is located in proximity to the circuit components of the recharging circuit and which is responsive to the change in temperature of one or more of the circuit's components. In addition, the preferred embodiment includes means for controlling the time interval of the surcharge in order to insure that the battery will be recharged to its rated electrical capacity. Furthermore, a thermistor or other means such as a meter, may be used as long as a change in current is recognized.

In view of the foregoing, it is an object of this invention to provide new and improved charging circuits.

Another object of this invention is to provide a new and improved charging circuit for providing a surcharge to a battery or the like.

Another object of this invention is to provide a new and improved circuit which recognizes a change in current flow in the circuit to initiate the surcharging of a battery.

A further object of this invention is to provide a new and improved battery charging circuit which provides a controlled time interval surcharge to a battery.

Still other objects and advantages of this invention will in part be obvious and will in part appear hereinafter.

The invention accordingly comprises the features of construction, combinations of elements and arrangements of devices which will be exemplified in the arrangements and circuits hereinafter set forth and the scope of the invention will be indicated in the claims.

For a fuller understanding of the nature and objects of the invention, reference should be had to the following detailed description, taken in conjunction with the accompanying drawings, in which FIG. 1 is a schematic diagram of one embodiment of this invention;

FIG. 2 is a diagram illustrating the voltage and current waveforms from the battery being charged vs. the time of charge, without the control circuitry of this invention;

FIG. 3 is a curve representing voltage and current waveforms of a battery, and the time, with controlled circuitry, according to this invention as shown in FIG. 1;

FIG. 4 is a schematic diagram of another charging circuit according to this invention, providing for a controlled charge of a battery;

Figure 5:
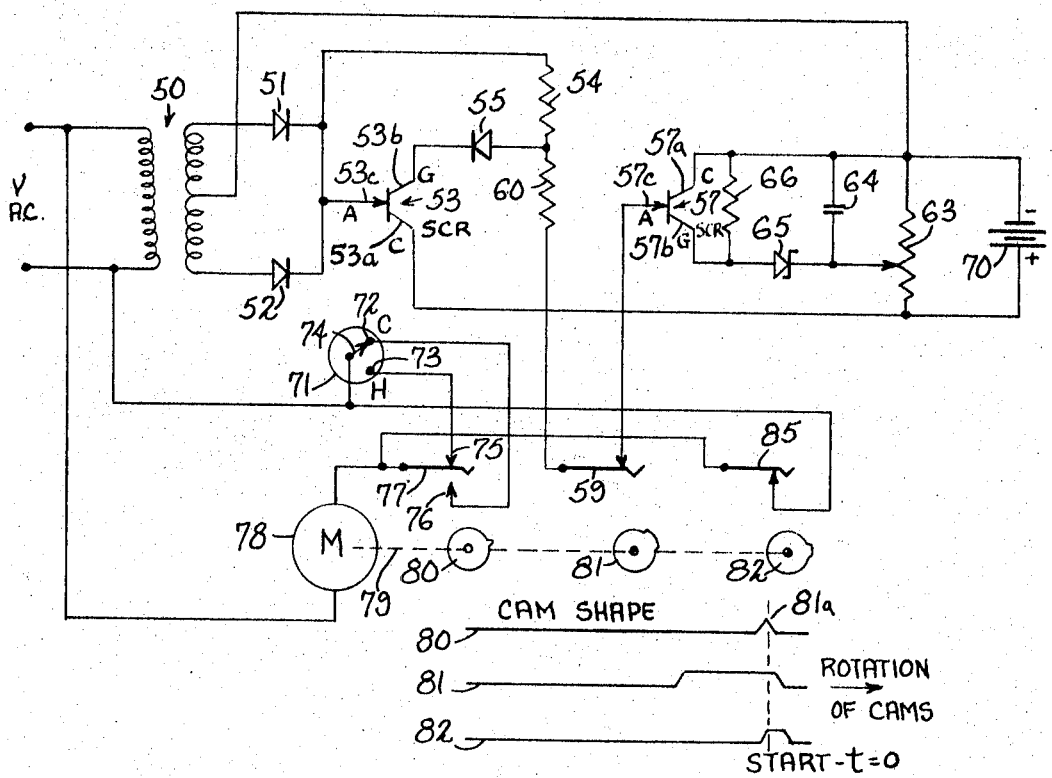
FIG. 5 illustrates the schematic diagram of the preferred recharging circuit according to this invention for recharging a battery.

Referring to FIGS. 1–3, there is disclosed the circuit diagram for recharging a nickel alkaline battery and two sets of curves, the first of which (FIG. 2) illustrates the charging of a nickel alkaline battery without control and the second, the charging of a nickel alkaline battery with the control circuit of FIG. 1.

FIG. 1 discloses a nickel alkaline battery 10 which is to be recharged from a voltage source shown at $V_{in}(DC)$. Connected across the terminals of $V_{in}(DC)$ are two series connected resistors 11 and 12 which are in turn in series with the nickel alkaline battery 10. Coupled across resistor 12 and in parallel therewith is a thermostat or thermo relay shown at 13 which is constructed to remain open when it is heated to a predetermined temperature and to close when components in its environment fall below a predetermined temperature. The resistors 11 and 12 and the thermostat 13 are all preferably mounted on the same heat sink 14, such that the thermostat will be responsive to the current flowing into the resistors 11 and 12.

In FIG. 2 there is shown the current voltage characteristics I and V, respectively, of a battery such as a nickel alkaline battery, as it is being charged vs. time. It will be noted that the voltage of the battery increases rapidly and that the current into the battery decreases rapidly as the battery comes up toward the voltage. FIG. 2 represents the result of the charging of the battery without any control whatsoever as, for example, by removal of the thermostat 13 of FIG. 1. With this type of arrangement, the battery voltage will approach approximately 80–85% of its rated value and will increase no further. Accordingly, the battery will not be suitably recharged to its full electrical capacity.

FIG. 3 shows the improvement achieved by the use of the circuit of FIG. 1. Initially, at time zero, the thermostat 13 contacts will be closed and the resistor 12 will be shorted out. Current will be forced into the battery and controlled by the value of resistor 11 substantially since, initially, the resistance of the battery is approximately zero. Very shortly thereafter the current will heat up resistor 11 and open the contacts of thermostat 13, thereby placing the two resistors in the circuit. As the battery comes up toward voltage, the current into the battery will decrease, thereby decreasing the heat in resistor 12. This will cause thermostat 13 to close, thereby shorting out resistor 12. Thus an initial surge of additional current will be forced into the battery to raise it closer to its original rated electrical capacity. The current will then trail off as the battery reaches its new voltage. The circuit may then be opened by throwing a line switch. If the line switch is not thrown, the circuit herein could provide means for furnishing an oscillating trickle current to a battery.

The circuitry of FIG. 1 illustrates the principle involved in this invention, in that the battery is provided with a current surcharge in order to drive the battery toward its full rated electrical capacity.

Referring now to FIG. 4, there is shown a refinement of the circuit of FIG. 1 to provide a degree of control for charging the battery. In this figure there is shown the battery 20 to be recharged. The battery is charged to a rectifier circuit which comprises two silicon controlled rectifiers or SCR's at 22 and 23. The SCR's have collectors 22a and 23a, gates 22b and 23b and anodes 22c and 23c, respectively. The first SCR 22 is operated as a switch in series with the battery 20 and is attached thereto by the connection of a collector 22a to the battery. The second controlled rectifier 23 acts as a control for providing a signal to turn on the controlled rectifier 22 in a predetermined time. A gating signal is provided to the gate 22b from the anode 23c by the provision of a resistor shown at 26 and a diode 27. Direct current is provided to the anode 22c from an AC source through an input transformer 29 and two rectifying diodes 30 and 31 respectively. The gate 22b is connected at the junction of resistors 26 and 33 through a diode 27.

In order to establish the gating signal to turn on and off, the silicon rectifier 23, resistors 35 and 36 are provided as well as a capacitor 37 and a Zener diode 38. As the battery voltage rises and the charge across capacitor 37 increases, Zener diode 38 will conduct turning on SCR 23 which will cause SCR 22 to cut off since the gate 22b of SCR 22 cannot receive a positive signal, thus preventing further battery charging. The silicon rectifier portion of the circuit is disclosed in an article entitled "X-Line Charger" by Oliver P. Ferrell, Popular Electronics, vol. 20, No. 3, March 1964, p. 47–51.

As an improvement to this basic rectifying circuit for charging a battery 20, this invention provides means for furnishing a current surcharge to the battery. This is accomplished in the circuit of FIG. 4 by the use of a thermostat shown at 40 which is placed in proximity to the components of the rectifier circuit, that is, it may be physically placed on the same heat sink as the SCR 22 or in proximity to the other circuit components, i.e. resistors, so as to recognize a decrease in the current flow to the battery. A decrease in the current flow will cause the components of the rectifying circuit to cool down, such that there will be a temperature decrease which may be recognized by the thermostat. The heat sink may be as shown in the previously-mentioned Popular Electronics article. As the battery current decreases, the thermostat closes, causing a shorting-out of a portion of the resistor 35, thus causing the operating voltage for turning on and off SCR 23 to change. The voltage changes in a manner such that SCR 22 will remain on for a longer period of time in order to force more current into battery 20.

Although it is to be understood that the circuit specifications for FIG. 4 may vary according to design for a particular application, the following circuit specifications are included for the illustrated circuit, by way of example only.

| | |
|---|---|
| SCR 22 | Motorola 101305–1. |
| SCR 23 | Motorola 1605–1. |
| Zener diode 38 | Motorola 473351 v. |
| Capacitor 37 | 100 microfarads. |
| Thermostat 40 | Stevens Inc. |
| Variable resistor 35 | 600 ohms. |
| Variable resistor 36 | 100 ohms. |
| Resistor 41 | 1000 ohms. |
| Resistor 33 | 68 ohms. |
| Resistor 26 | 33 ohms. |
| Diodes | Westinghouse W–368B. |
| Battery | Size 6 v. nickel alkaline. |

Figure 6:
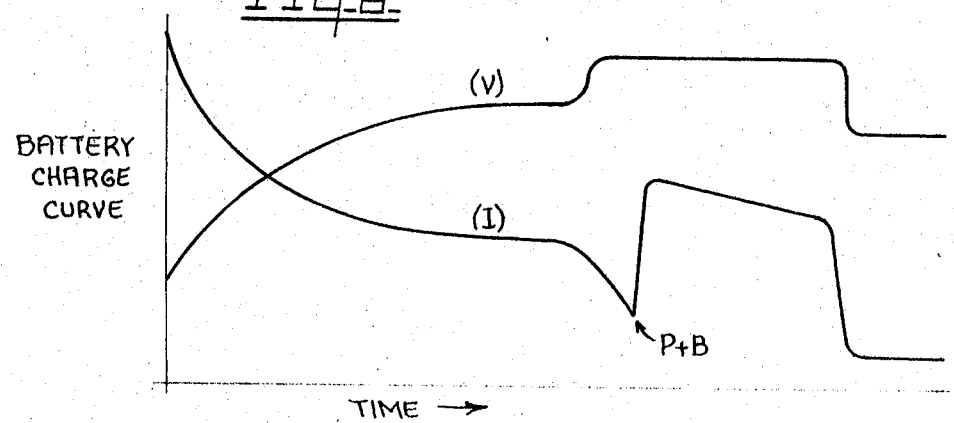
FIG. 6 shows the voltage and current waveforms of the battery as it is charged vs. time, using the preferred circuit shown in FIG. 5.

Referring now to FIGS. 5 and 6, there is shown the preferred embodiment of this invention. The circuit of FIG. 5 not only provides a surcharge to the battery to be recharged but also controls the time interval during which the surcharge is provided to the battery. This is an improvement over the circuits of FIGS. 1 and 4, since in the first two circuits shown there is no provision for insuring that a surcharge current will be provided for a predetermined time interval. The circuit of FIG. 5 is quite similar to that of FIG. 4 except that the second rectifier in the circuit of FIG. 5 is prevented from controlling the first silicon rectifier for a predetermined time interval.

It is to be understood that in both FIGS. 4 and 5 a surcharge current is provided to the battery as a result of a drop in the current to the battery as the battery recharges.

Referring particularly to FIG. 5, an AC voltage is provided to a transformer shown at 50 and is then DC rectified by two diodes 51 and 52, respectively. The rectified voltage is presented to a first silicon controlled rectifier 53 having a collector 53a, a gate 53b and an anode 53c. The anode 53c is coupled to gate 53b through a resistor 54 and a diode 55. A second controlled rectifier is provided at 57 and includes a collector 57a, a gate 57b and an anode 57c. The anode 57c is coupled to a normally open relay contact 59 and then through a resistor 60 to the junction of diode 55 and resistor 54 in order to provide a control signal to controlled silicon rectifier 53. To set the level of the gate signal provided to gate 57b of silicon controlled rectifier 57, there is provided a resistor pot 63, capacitor 64, Zener diode 65 and resistor 66. The voltage at gate 57b is set by the capacitor 64, resistor 63 and Zener diode 65 to conduct and thereby trigger silicon controlled rectifier 57. This in turn will cause the controlled rectifier 53 to turn off when the relay 59 is held closed. This circuit operates in the same manner as the circuit of FIG. 4.

The battery to be charged is shown at 70 and is connected across resistor 63 such that it will be recharged from the silicon controlled rectifier 53. In order to produce the surcharge, there is provided a thermostat 71 of the type having two position contacts, 72 and 73 and an arm 74 which will position itself on either of the contacts. The contact 72 is the cold side or cold contact and contact 73 is the hot side. When the thermostat is operating below a predetermined temperature, the arm 74 will be positioned on contact 72 and when the temperature in the environment of the thermostat goes above a predetermined set level the arm 74 will switch to contact 73. The thermostat 71, as mentioned previously, is positioned in proximity to the heat-generating circuit components of the rectifier circuit, such as the silicon controlled rectifier, the resistors or transformers. The thermostat may be positioned on the same heat sink as these components, or may be positioned on some other support means, as long as it is in proximity to record the temperature of any of the heat-generating components. In this manner it will thus be able to recognize a change in the temperature due to a change in current flow through the rectifier.

The arm 74 of thermostat 71 is coupled to the AC voltage and contacts 72 and 73 are coupled to relay contacts 75 and 76, respectively. In conjunction with mover relay arm 77, these contacts are used to control a timer motor shown at 78. The timer motor has a shaft 79 on which there are mounted three shaped cams, 80–82. The shape of these cams is shown below the cams in the diagram, numbered 80–82. Cam 80 is used to engage relay contact 77, cam 81 is used to engage normally open relay contactor 59, and cam 82 is used to engage normally closed relay contactor arm 85.

The operation of the control portion of the circuit, including thermostat 71 and the timer motor 78, is as follows: initially, at time zero as shown on the graph illustrating the cam shapes, arm 77 is held up against the hot contact 75 by the protrusion 81a of cam 81. The normally open contactor arm 59 is in a closed position such that SCR 57 is in the circuit with SCR 53 in order to control it. Additionally, normally closed contactor arm 85 is held open by cam 82. The alternating voltage is turned on and the rectifier circuit begins to heat up, such that thermostat arm 74 moves to the hot position 73 which causes motor 78 to initially start and rotate shaft 79. Arm 77 then drops downwardly to its normal position against contact 76 while contact arm 85 remains held open and stops the motor 78. As the battery continues to charge, the current begins to decrease such that at point P+B the thermostat arm 74 will snap on to the cold position contact 72 and cause the motor to once again turn on and rotate shaft 79. The rotation of shaft 79 starts a timed cycle. The motor continues to rotate regardless of the position of arm 74 since the normally closed contact 85 closes as cam 83 is no longer in position to hold it off its contact.

Additionally, the shape of the cam 81 permits arm 59 to open, thus preventing SCR 57 from controlling SCR 53. This permits SCR 53 to provide a surcharge current, starting at point B. At this time the current I rapidly increases due to the surcharge current. After a predetermined period of time, the motor has rotated the cams such that cam 81 forcibly causes contact 59 to close once again and SCR 57 once again exercises control. A trickle current then begins, such that arm 74 of thermostat 71 swings to cold position contact 72 while, at the same time, cam 80 holds arm 77 against hot contact 75, the hot contact of the thermostat. Also at the same time, cam 82 holds contact 85 away from its contact and, therefore, motor 78 stops and the surcharge operation cycle is completed.

While it will be understood that the circuit specifications may vary according to design for any particular application, the following circuit specifications are included for the illustrated circuit of FIG. 5, by way of example only.

Thermostat 71—Stevens Type GY-8
Motor timer 78—Cramer Type 117 RPH16 Model 590A

The remaining components may be the same as described in conjunction with FIG. 4.

It will thus be seen that the objects set forth above, among those made apparent from the preceding description, are efficiently attained and since certain changes may be made in the above constructions without departing from the spirit and scope of the invention, it is intended that all matter contained in the foregoing description and shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. For use in combination with a source of electricity providing direct current to recharge a battery; means for coupling the source to a battery, means for sensing the magnitude of the current flowing through said coupling means to the battery, and means responsive to said sensing means for increasing the current through said coupling means to the battery when the charging current falls below a predetermined value while the battery charges toward a fully charged condition.

2. The apparatus of claim 1 wherein said sensing means comprises a temperature responsive device constructed and arranged to sense the magnitude of the current through said coupling means.

3. The apparatus of claim 2 wherein said temperature responsive means is positioned in close proximity to a circuit component of said coupling means to recognize a change in temperature of said component in response to a decrease in charging current therethrough.

4. The apparatus of claim 3 wherein said temperature responsive means comprises a thermostat.

5. In combination with a rectifier circuit means for providing a direct current to recharge a battery or the like from a source of alternating current, the improvement comprising means responsive to the temperature of a component of said rectifier circuit to sense the magnitude of the current therethrough, means responsive to said temperature responsive means to increase the current provided by said rectifier circuit means to the battery when the temperature of the component falls below a predetermined level while the battery charges toward its full capacity, in order to provide an overcharge current to restore the battery to its rated electrical capacity.

6. A combination in accordance with claim 5, wherein said means responsive to the temperature of a component comprises thermostat means.

7. In combination with a rectifier circuit means for use in combination with a source of electricity providing direct current to recharge a battery or the like, the improvement comprising means responsive to a reduction of current flow into the battery from said rectifier circuit as the battery charges toward its full capacity, means for increasing the current provided to said battery from said rectifier circuit in response to the recognition of said reduction of current flow in order to provide an overcharge current to said battery, and means for maintaining said increased current to said battery for a predetermined period of time.

8. A combination in accordance with claim 7, wherein said last-mentioned means includes clock means for controlling the time interval said increased current is provided to said battery.

9. A combination in accordance with claim 8, wherein said clock means comprises a motor for driving a plurality of shaped cams.

10. A combination in accordance with claim 7, wherein said means responsive to a reduction of current flow comprises a thermostat positioned in proximity to a heat generating component of said rectifier circuit.

11. In combination, a rectifier circuit comprising a first controlled rectifier device and a second controlled rectifier device, said second controlled rectifier device providing a signal to the controlling operation of said first controlled rectifier device, a thermostat positioned in proximity to said rectifier circuit for recognizing a change in current flow through said rectifier circuit, and means responsive to the operation of said thermostat for preventing said second controlled rectifier device from controlling said first controlled rectifier device for a predetermined period of time.

12. A combination according to claim 11, wherein said last-mentioned means includes a clock motor for driving a plurality of cams for preventing said second controlled rectifier device from controlling said first controlled rectifier device.

13. A combination according to claim 12, wherein said cams comprise three in number and wherein one of said cams initiates the start of the clock motor and another of said cams initiates the overcharge cycle by preventing said second controlled rectifier device from controlling said first controlled rectifier device.

References Cited

UNITED STATES PATENTS

| | | | |
|---|---|---|---|
| 2,427,729 | 9/1947 | Jenkins | 320—22 |
| 3,225,280 | 12/1965 | Happe et al. | 318—473 X |
| 3,278,823 | 10/1966 | Ross | 323—22 X |
| 3,310,724 | 3/1967 | Grafham | 320—39 |

FOREIGN PATENTS

| | | |
|---|---|---|
| 549,018 | 11/1942 | Great Britain. |
| 1,424,731 | 8/1922 | Linebarger 320—35 |

JOHN F. COUCH, Primary Examiner

STANLEY WEINBERG, Assistant Examiner

U.S. Cl. X.R.

320—31, 35, 39; 321—18; 323—1, 68, 96